United States Patent [19]
Yamazaki et al.

[11] Patent Number: 5,852,276
[45] Date of Patent: Dec. 22, 1998

[54] LASER MACHINING RESUMING METHOD

[75] Inventors: Etsuo Yamazaki, Kitatsuru-gun; Teruo Masuda, Minamitsuru-gun, both of Japan

[73] Assignee: Fanuc Ltd, Minamitsuru, Japan

[21] Appl. No.: 290,737

[22] PCT Filed: Dec. 7, 1993

[86] PCT No.: PCT/JP93/01778

§ 371 Date: Aug. 16, 1994

§ 102(e) Date: Aug. 16, 1994

[87] PCT Pub. No.: WO94/14566

PCT Pub. Date: Jul. 7, 1994

[30] Foreign Application Priority Data

Dec. 28, 1992 [JP] Japan ................. 4-348183

[51] Int. Cl.$^6$ ............................... B23K 26/08
[52] U.S. Cl. ................. 219/121.62; 219/121.72; 219/121.53
[58] Field of Search .............. 219/121.61, 121.62, 219/121.67, 121.72, 121.78, 121.79, 121.8, 121.81, 121.83, 121.85; 364/474.08

[56] References Cited

U.S. PATENT DOCUMENTS 5,293,024  3/1994  Sugahara et al. ............. 219/121.67

FOREIGN PATENT DOCUMENTS

| | | |
|---|---|---|
| 61-189891 | 8/1986 | Japan. |
| 2-55685 | 2/1990 | Japan. |
| 2-142688 | 5/1990 | Japan. |
| 3-254380 | 11/1991 | Japan. |
| 4-94883 | 3/1992 | Japan. |

*Primary Examiner*—Teresa J. Walberg
*Assistant Examiner*—Gregory L. Mills
*Attorney, Agent, or Firm*—Staas & Halsey

[57] ABSTRACT

A laser machining resuming method in which the laser machining can be securely resumed without leaving an un-machined portion when machining is interrupted while laser machining is being carried out. When laser machining is performed a distance of $L_0$ from a machining point (P1) and abnormal machining is sensed at a machining point (P3), a CNC starts a retry processing in response to an abnormal machining sensing signal. That is, first, the laser machining is stopped and the position of the machining point (P3) at the time is stored. Next, the machining head is retracted a distance $h_0$ in a Z-axis direction and moved backward a distance $L_2$ along a machining path L having been executed until that time. When the backward movement is completed at a point (P6), a gap between a nozzle and a workpiece is controlled, and the laser machining is resumed on the completion of the approach. When the CNC receives an abnormal machining sensing signal again while the machining head is being moved forward from a machining point (P7) to a machining point (P4), the retry processing is carried out again. When the number of repetition of the retry processing exceeds the predetermined number of times $n_0$, e.g., three times, the machining block having been executed is stopped and skipped to execute machining of the next block.

5 Claims, 4 Drawing Sheets

5,852,276

LASER MACHINING RESUMING METHOD

BACKGROUND OF THE INVENTION

1. Field of the Invention

The present invention relates to a laser machining resuming method of resuming laser machining which is interrupted while it is being carried out.

2. Description of the Related Art

A laser machining resuming method of resuming laser machining which is interrupted due to burning and the like while it is being carried out is one of the most important problems for automatically carrying out laser machining. As the laser machining resuming method, there is conventionally known a method by which, when laser machining is interrupted due to the occurrence of abnormal machining and the like, a machining head is once retracted in a Z-axis direction and machining is carried out again at the position where the laser machining is interrupted to resume the laser machining.

Nevertheless, even if machining is stopped by detecting abnormal machining and the like, a problem arises in that since a machine cannot stop at once, there remains an unmachined portion before the machining head completely stops. In the above prior art, machining is resumed from the aforesaid state. Therefore, laser machining cannot be resumed well or even if it can be resumed, the unmachined portion is left because the cause of the abnormal machining remains as it is.

SUMMARY OF THE INVENTION

Taking the above into consideration, an object of the present invention is to provide a laser machining resuming method capable of securely resuming laser machining without leaving an unmachined portion.

To solve the above problem, according to the present invention, there is provided a laser machining resuming method of resuming laser machining when the laser machining is interrupted while it is being carried out, comprising the steps of interrupting the laser machining when abnormal machining is sensed while the laser machining is being carried out, storing a position where the laser machining is carried out when the abnormal machining is sensed as well as retracting a machining head a predetermined distance, moving the machining head backward a predetermined distance along a machining path along which the laser machining has been executed until the occurrence of interruption of the laser machining on the completion of the retraction, causing the machining head to approach a workpiece on the completion of the backward movement, resuming the laser machining on the completion of the approach and moving forward the machining head along the machining path along which the laser machining has been executed until the occurrence of interruption of the laser machining, determining whether the machining head has passed through the machining position where the abnormal machining was sensed, repeating a retry processing including the processes from the interruption of the laser machining to the forward movement of the machine head due to the resume of the laser machining when the abnormal machining is sensed again before the machining head passes through the machining position where the abnormal machining was sensed, and skipping the machining block and starting the laser machining from a next machining block when the number of repetition of the retry processing has reached the predetermined number of times.

When abnormal machining is sensed while laser machining is being carried out, a retry processing is started to resume the laser machining. That is, first, the CNC (numerical control apparatus) interrupts the laser machining in response to an abnormal machining sensing signal and stores a machining position at the time as well as retracts the machining head a predetermined distance. On the completion of the retraction, the CNC moves the machining head backward a predetermined distance along the machining path along which the laser machining has been executed until the occurrence of interruption of the laser machining. On the completion of the backward movement, the CNC causes the machining head to approach the workpiece. On the completion of the approach, the CNC resumes the laser machining and moves the machining head forward along the machining path along which the laser machining has been executed until the occurrence of interruption of the laser machining. At the time, the CNC determines whether or not the machining head has passed through the machining position where the abnormal machining was sensed, and when abnormal machining is sensed again before the machining head passes through the machining position where the abnormal machining was sensed, the CNC repeats the retry processing including the processes from the interruption of the laser machining to the forward movement of the machining head due to the resume of the laser machining. When the number of repetition of the retry processing has reached the predetermined number, the machining block having been executed is skipped and the laser machining is resumed from the next machining block. When the machining head has passed through the machining position where the abnormal machining was sensed without causing abnormal machining, machining is continued according to a command from a program.

DETAILED DESCRIPTION OF THE PREFERRED EMBODIMENTS

An embodiment of the present invention will be described below with reference to the drawings.

Figure 1:
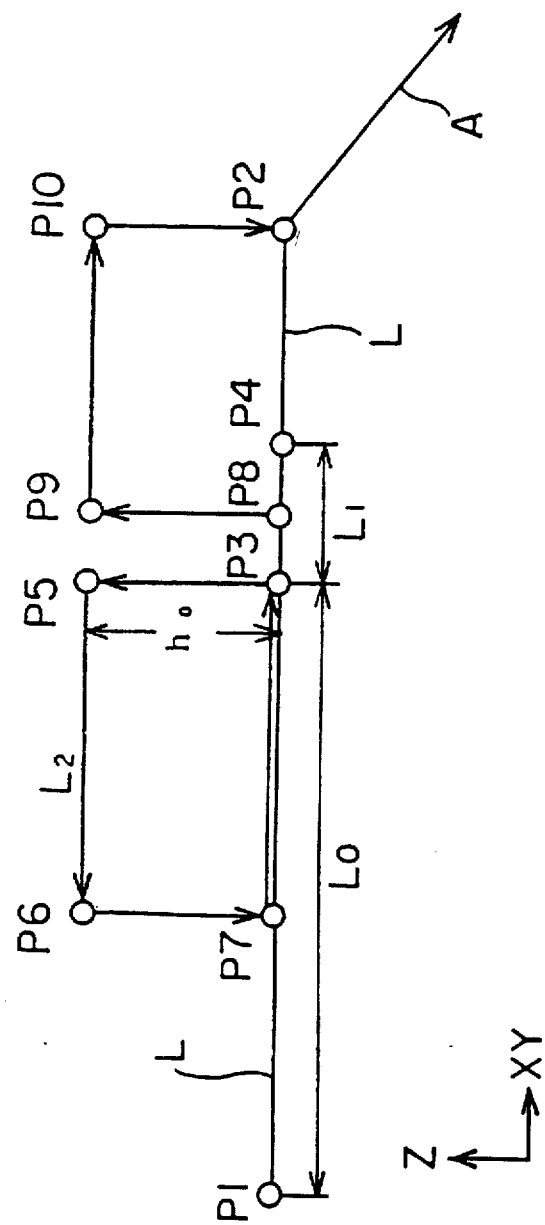
FIG. 1 is a diagram explaining a laser machining resuming method of the present invention.

FIG. 1 is a diagram explaining a laser machining resuming method of the present invention. In FIG. 1, a machining head of a laser beam machine moves along a path (machining path) L from a machining point P1 to a machining point P2 and further moves in the direction of an arrow A from the point P2 to execute laser machining. The movement of the machining head and the laser machining are controlled by a numerical control apparatus (CNC) according to a machining program stored in a memory of the numerical control apparatus.

There is assumed a case in which laser machining is carried out a distance $L_0$ from the machining point P1 and abnormal machining is sensed at a machining point P3. The abnormal machining is sensed by, for example, a photo sensor which senses a luminous energy generated at a machining point when burning is caused. On receiving an abnormal machining sensing signal, the CNC starts a retry processing to resume the laser machining. That is, first, the CNC stops (interrupts) the laser machining and stores the position of the machining point P3 at the time. The laser machining is stopped by turning off both of a laser beam and an assist gas. Next, the machining head is retracted a distance $h_0$ in a Z-axis direction. When the retract of the machining head is completed at a point P5, the machining head is moved backward a distance $L_2$ along the machining path L which has been executed until that time. When the backward movement is completed at a point P6, the machining head is moved in a −(minus) Z-axis direction and caused to approach a machining point P7 and a gap between a nozzle and a workpiece is controlled. On the completion of the approach, the laser machining is resumed and a forward movement of the machining head is started toward the machining point P3 by generating a movement command commanding the machining point P3 as a machining end point. The laser machining is resumed by turning on both of the laser beam and the assist gas.

Thereafter, the machining head is moved forward from the machining point P7 along the machining path L, and when the machining head returns to the machining point P3, a machining block which has been executed until the occurrence of interruption of the laser machining is fetched and the execution of the machining block is resumed. When the execution of the machining block is resumed and the machining head reaches the machining point P2 as the machining end point of the machining block, the next machining block is executed in this state to continue the laser machining in the direction of the arrow A.

On the other hand, when the CNC receives an abnormal machining sensing signal again while the machining head is being moved forward from the machining point P7 to the machining point P3, the aforesaid retry processing including the stop of laser machining, retraction, backward movement, gap control and forward movement is carried out again. A point P4, which is apart from the machining point P3 by a distance $L_1$ (hereinafter, referred to as a "passing-through distance $L_1$"), is preset on the machining path L, and when the CNC receives an abnormal machining sensing signal again when the machining head moves in the passing-through distance $L_1$ after having passed through the machining point P3, the CNC also executes the retry processing.

The passing-through distance $L_1$ is set with respect to the machining point P3 where the first abnormal machining was sensed as described above so that laser machining should be securely carried out in the vicinity of the position where the abnormal machining was sensed, because similar abnormal machining may be caused in this region.

As described above, when an abnormal machining sensing signal is produced while laser machining is being carried out again from the machining point P7 to the machining point P4, the CNC repeats the retry processing. When the number of the repeated retry processings exceeds a predetermined number $n_0$, e.g., three times, however, the execution of the machining block is stopped and skipped, and the next machining block is executed. For example, in FIG. 1, when abnormal machining is sensed at a machining point P8 while the third retry processing is being executed, the CNC stops laser machining to be executed thereafter and makes the machining head skip to the machining point P2 through a point P9 and a point P10 and resumes new laser machining from the machining point P2.

Although the arrangement in the above description is such that when a retry processing is started, the machining head is retracted in the Z-axis direction, an amount of the retraction may be set to 0 depending upon a status in which the workpiece is being machined.

Figure 2:
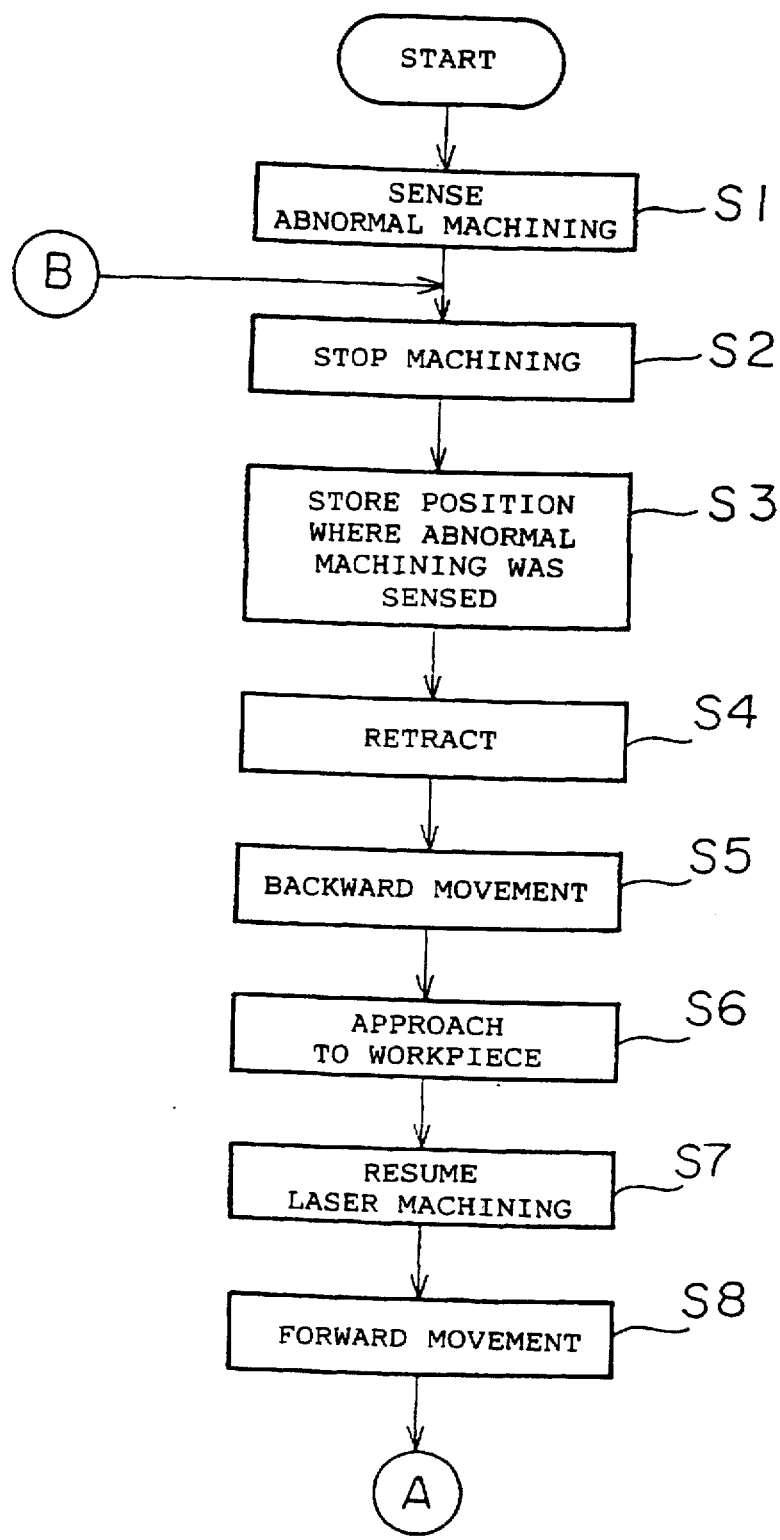
FIG. 2 is a flowchart showing a processing sequence of the present invention.
Figure 3:
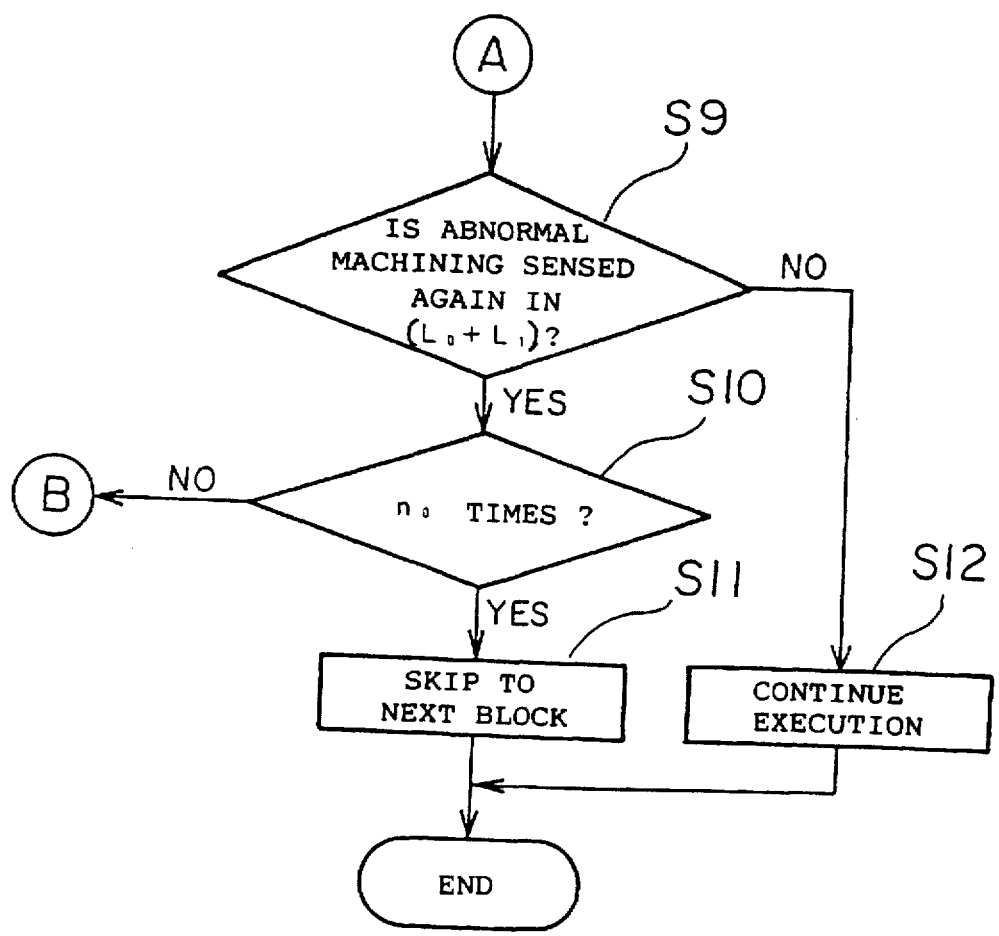
FIG. 3 is a flowchart showing the processing sequence of the present invention.

FIGS. 2 and 3 are flowcharts showing a processing sequence of the present invention. In FIGS. 2 and 3, each numeral following the letter "S" represents a step number.

[S1] First, an abnormal machining sensing signal is received from the photo sensor or the like.

[S2] Laser machining is stopped by turning off a laser beam and an assist gas.

[S3] A position where abnormal machining was sensed is stored.

[S4] The machining head is retracted the predetermined distance $h_0$.

[S5] The machining head is moved backward the predetermined distance $L_2$ along the machining path L.

[S6] The machining head is approached to a workpiece and a gap is controlled.

[S7] The laser beam and the assist gas are turned on and laser machining is resumed.

[S8] The machining head is moved forward along the machining path L.

[S9] It is determined whether or not abnormal machining is sensed before the machining head passes through the passing-through distance $L_1$. If abnormal machining is sensed again, the process goes to step S10, and if not, the process goes to step S12.

[S10] It is determined whether or not abnormal machining has been sensed the predetermined number of times $n_0$. If it has been sensed $n_0$ times, the process goes to step S11, and if not, the process returns to step S2 and executes the retry processing again.

[S11] Since abnormal machining has been sensed $n_0$ times, the execution of a machining block which has been executed until that time is stopped and skipped to execute machining of the next block.

[S12] Since no abnormal machining is sensed, the laser machining is continued as it is.

As described above, when abnormal machining is sensed while laser machining is being carried out, the retry processing for resuming the laser machining is started and the laser machining is resumed after the machining head is returned the predetermined distance $L_2$. As a result, laser machining can be securely resumed without leaving an unmachined portion which is produced when abnormal machining is caused.

Since machining is skipped to the next machining block when abnormal machining is caused even after the retry processing is repeated the predetermined number of times $n_0$, laser machining can be continuously carried out without being stopped even if a laser beam machine is in an unmanned operation.

Further, since the passing-through distance $L_1$ is set, a retry processing is also carried out in a region where abnormal machining similar to that sensed for the first time may occur even after the machining head passes through the position where the abnormal machining was sensed for the first time. Therefore, laser machining can be securely carried out in the vicinity of a position where abnormal machining is caused.

Figure 4:
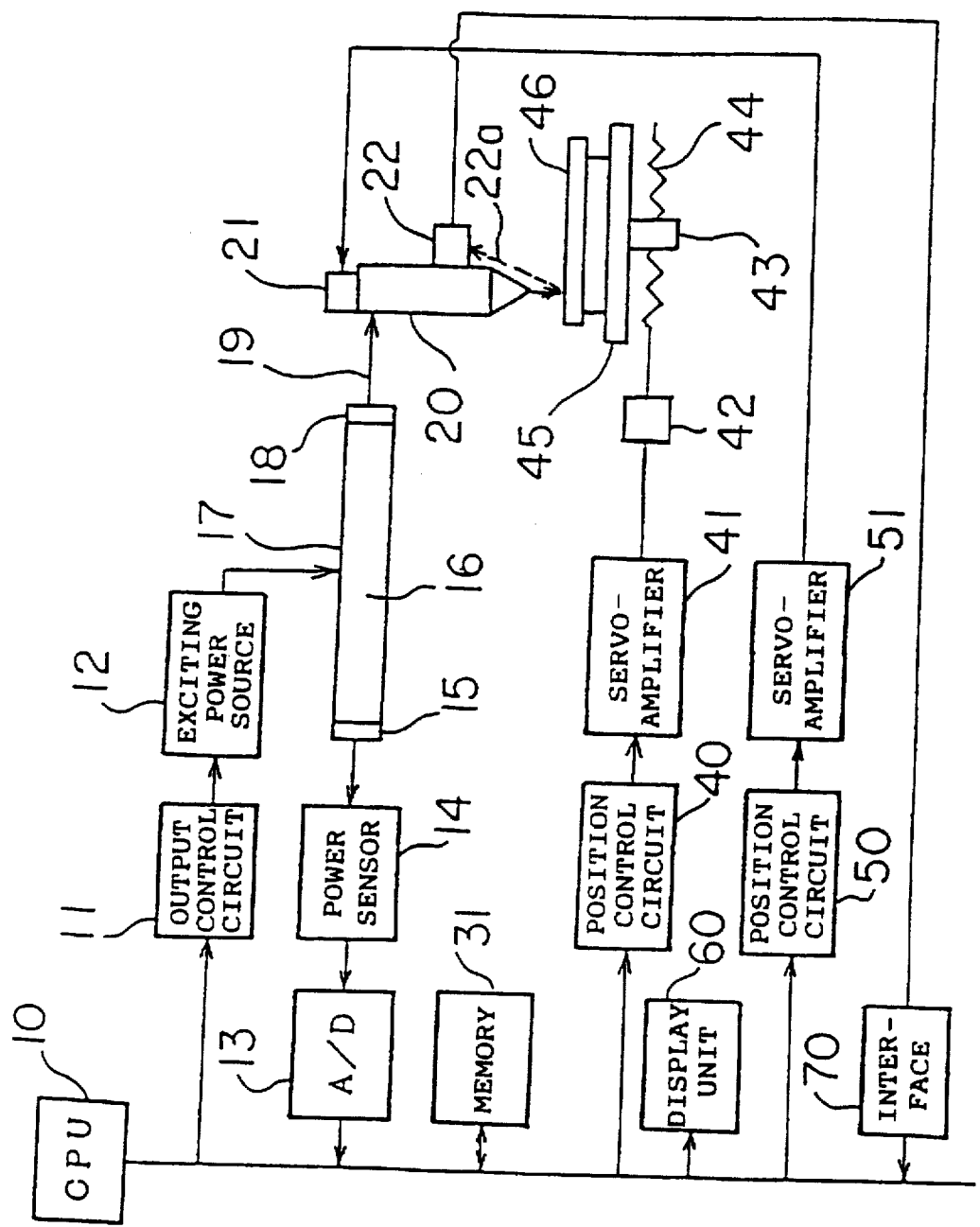
FIG. 4 is a block diagram showing an entire arrangement of a laser beam machine to which the laser machining resuming method of the present invention is applied.

FIG. 4 is a block diagram showing an entire arrangement of a laser beam machine to which the laser machining resuming method of the present invention is applied. In FIG. 4, a processor 10 reads a program, which is stored in a memory 31, for executing the laser machining resuming method of the present invention and controls the entire operation of the laser beam machine. The memory 31 is a nonvolatile memory storing machining programs, various parameters and the like and composed of a CMOS backed up by a battery.

An output control circuit 11, which contains a D/A converter, converts an output command value from the processor 10 into a current command value and outputs the current command value. An exciting power source 12 rectifies a commercially available electric power, produces a high frequency voltage by carrying out a switching operation and supplies a high frequency current according to the current command value to a discharge tube 17 of a laser oscillator. A laser gas 16 circulates in the discharge tube 17, and when the high frequency voltage is applied from the exciting power source 12, discharging is produced and the laser gas 16 is excited. A Fabry-Perot resonator, which is composed of a rear mirror 15 and an output mirror 18, excites laser gas molecules and outputs a laser beam 19 to the outside. A power sensor 14, which is composed of a thermoelectric converting element, a photoelectric converting element or the like, measures an output power of the laser beam 19 by receiving the laser beam partially output through the rear mirror 15. An A/D converter 13 converts an output from the power sensor 14 into a digital value and inputs the digital value to the processor 10.

The output laser beam 19 is converged on a machining head 20 and irradiated onto a surface of a workpiece 46 to carry out laser machining. The machining head 20 is provided with a photo sensor 22. The photo sensor 22 senses an abnormal light 22a which is produced when abnormal machining such as burning and the like is caused while the workpiece 46 is being machined, and thereafter supplies a sensed result to the processor 10 through an interface 70 as an abnormal machining sensing signal.

A position control circuit 40 controls rotation of a servomotor 42 through a servoamplifier 41 in response to a command from the processor 10, and controls a movement of a table 45 by a ball screw 44 and a nut 43 to thereby control a position of the workpiece 46. The servomotor 42 controls a position in an X-axis direction of the table 45. Note, a position control circuit, a servoamplifier, a servomotor and the like in a Y-axis direction are not shown in FIG. 4.

A position control circuit 50 controls rotation of a servomotor 21 through a servoamplifier 51 in response to a command from the processor 10 to thereby control a position in a Z-axis direction of the machining head 20. A display unit 60 is composed of a CRT, a liquid display panel or the like.

As described above, according to the present invention, when abnormal machining is sensed while laser machining is being carried out, a retry processing is started to resume the laser machining, which is to be resumed after the machining head is returned a predetermined distance. As a result, the laser machining can be securely resumed without leaving an unmachined portion which is produced when abnormal machining is caused.

Further, since laser machining is skipped to a next machining block when abnormal machining is caused even after the retry processing is repeated the predetermined number of times, the machining can be continuously carried out without being stopped even if a laser beam machine is in an unmanned operation.

We claim:

1. A laser machining resuming method of resuming laser machining when the laser machining is interrupted while it is being performed, comprising the steps of:

a) performing a laser machining of a workpiece in a machining block along a machining path;

b) sensing an abnormal machining operation at a first machining position in said machining block along said machining path during said laser machining;

c) interrupting said laser machining when said abnormal machining operation is sensed;

d) storing said first machining position;

e) retracting a machining head a first predetermined distance from said first machining position;

f) moving said machining head backward a second predetermined distance from a position of said machining head at said first predetermined distance along said machining path;

g) advancing said machining head toward said workpiece from a position of said machining head at said second predetermined distance to a second machining position in said machining block along said machining path before said first machining position;

h) resuming said laser machining from said second machining position and moving said machining head forward in said machining block along said machining path;

i) sensing an abnormal machining operation at a new machining position along said machining path during said laser machining;

j) determining whether said new machining position is before or after said first machining position;

k) performing a retry process by repeating steps c)–j) for said new machining position when it is determined that said new machining position is before said first machining position; and l) skipping said machining block and starting said laser machining from a next machining block when said retry process is repeated a predetermined number of times.

2. A laser machining resuming method according to claim 1, wherein said interrupting step includes the step of turning off a laser beam and an assist gas and said resuming step includes the step of turning on the laser beam and the assist gas.

3. A laser machining resuming method according to claim 1, wherein said first predetermined distance of said retracting step is set to 0.

4. A laser machining resuming method according to claim 1, further including the step of repeating steps c)–j) when it is determined that said new machining position is after said first machining position by a third predetermined distance.

5. A laser machining resuming method according to claim 4, wherein said resuming step includes the steps of changing a laser output and a feed speed according to preset retry laser machining conditions, and when said machining head has passed through said third predetermined distance, returning said preset retry machining conditions to values commanded by a program.

* * * * *